United States Patent Office 3,504,888
Patented Apr. 7, 1970

3,504,888
PLUG VALVE CONSTRUCTION
Charles L. Bates, Jr., and Lawrence A. Haines, Provo,
Utah, assignors to Valtek Incorporated, a corporation
of Utah
Filed Oct. 18, 1967, Ser. No. 676,205
Int. Cl. F16k 3/16
U.S. Cl. 251—214                                 4 Claims

ABSTRACT OF THE DISCLOSURE

A plug type flow control valve having a removable bonnet, a plug guided solely by guides in the bonnet acting on the major diameter of the plug stem as it passes through the bonnet, the plug seat ring being retained in the valve body by an open cage that loosely encircles the plug and together with the seat ring is clamped between the bonnet and the body bridge.

---

This invention relates generally to control valves and and in particular to a plug valve of improved design adapted for either automatic or manual operation and for handling a wide variety of materials, including corrosive materials.

A primary object of the invention is to provide a plug valve of construction enabling the valve to be permanently installed yet providing ready access to its interior for replacement or repair of parts.

A further object is the provision of such a valve wherein the plug is sealed while being precisely guided to and from engagement with the seat ring by seals and a particular arrangement of guides housed in removable bonnet and operating solely on the plug stem; and the seat ring is removably clamped in the valve body by a removable cage type retainer mounted concentric with the plug.

Another object is the provision of a valve attaining the foregoing objects and is also of a construction that avoids binding or jamming of the plug stem due to solids accumulation on interior valve parts.

The foregoing and probably other objects apparent to those skilled in the art to which this invention pertains are achieved by a valve having a housing with an inlet and outlet and adapted to be secured in a flow line, an interior valve seat formed about a port in bridge intermediate the inlet and outlet, an access opening into the valve adjacent the valve seat, a bonnet fitted into said opening, a plug having an elongated stem sealingly guided at its major diameter solely by means in the bonnet, a valve seat ring mounted on the valve seat, an open circular cage adapted to bear against the seat ring, and means for detachably securing the bonnet on the valve with the plug guided toward said seat ring and the bonnet holding the cage concentrically about the plug while clamping the valve seat ring in place on the valve seat.

In order that the invention may be more readily understood and carried into effect reference is made to the accompanying drawings and the description thereof which are offered by way of example only and not in limitation of the invention, the scope of which is defined by the appended claims including equivalents thereof.

Figure 1:
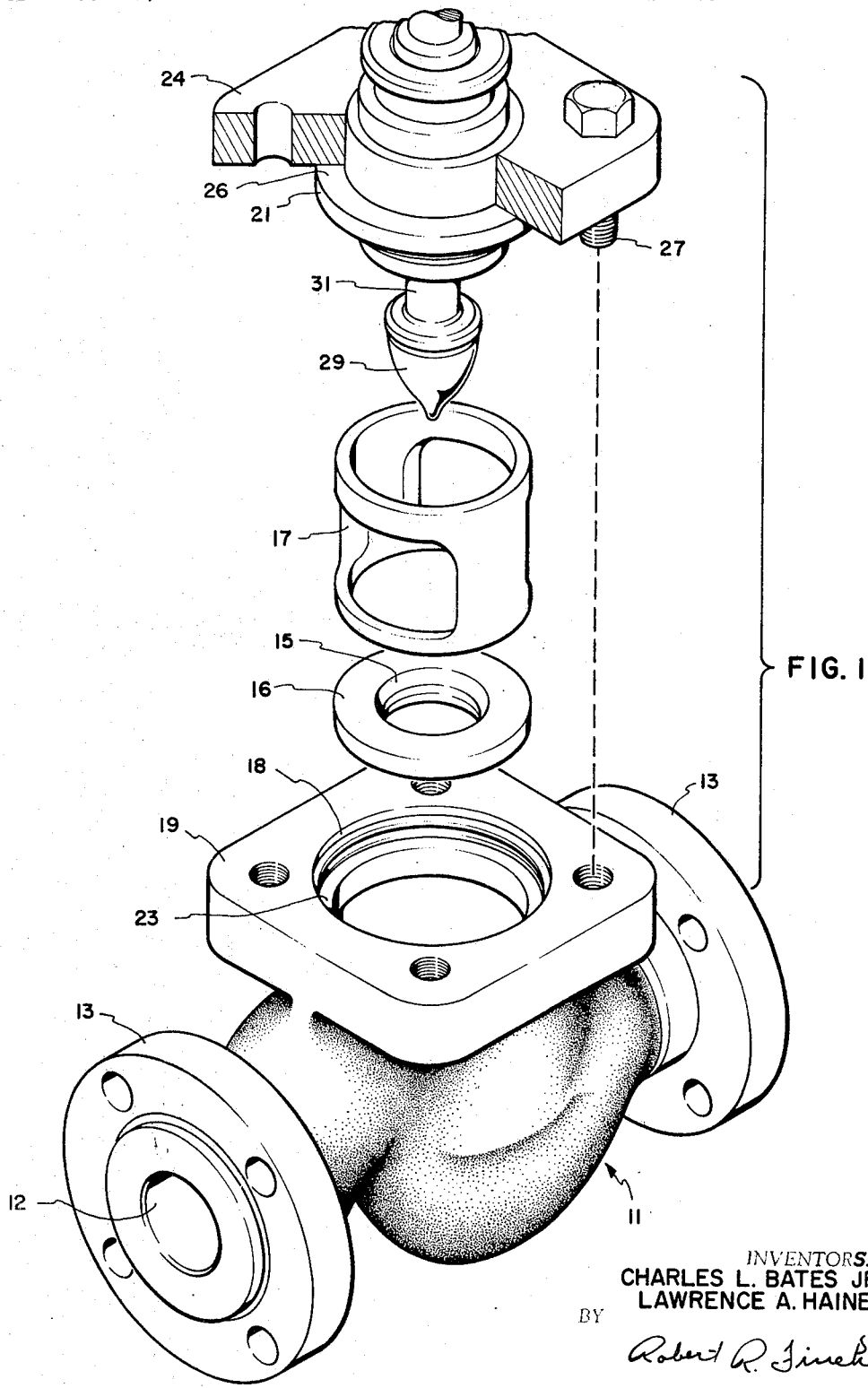
FIG. 1 is an exploded view illustrating the major elements of a valve embodying the invention.
Figure 2:
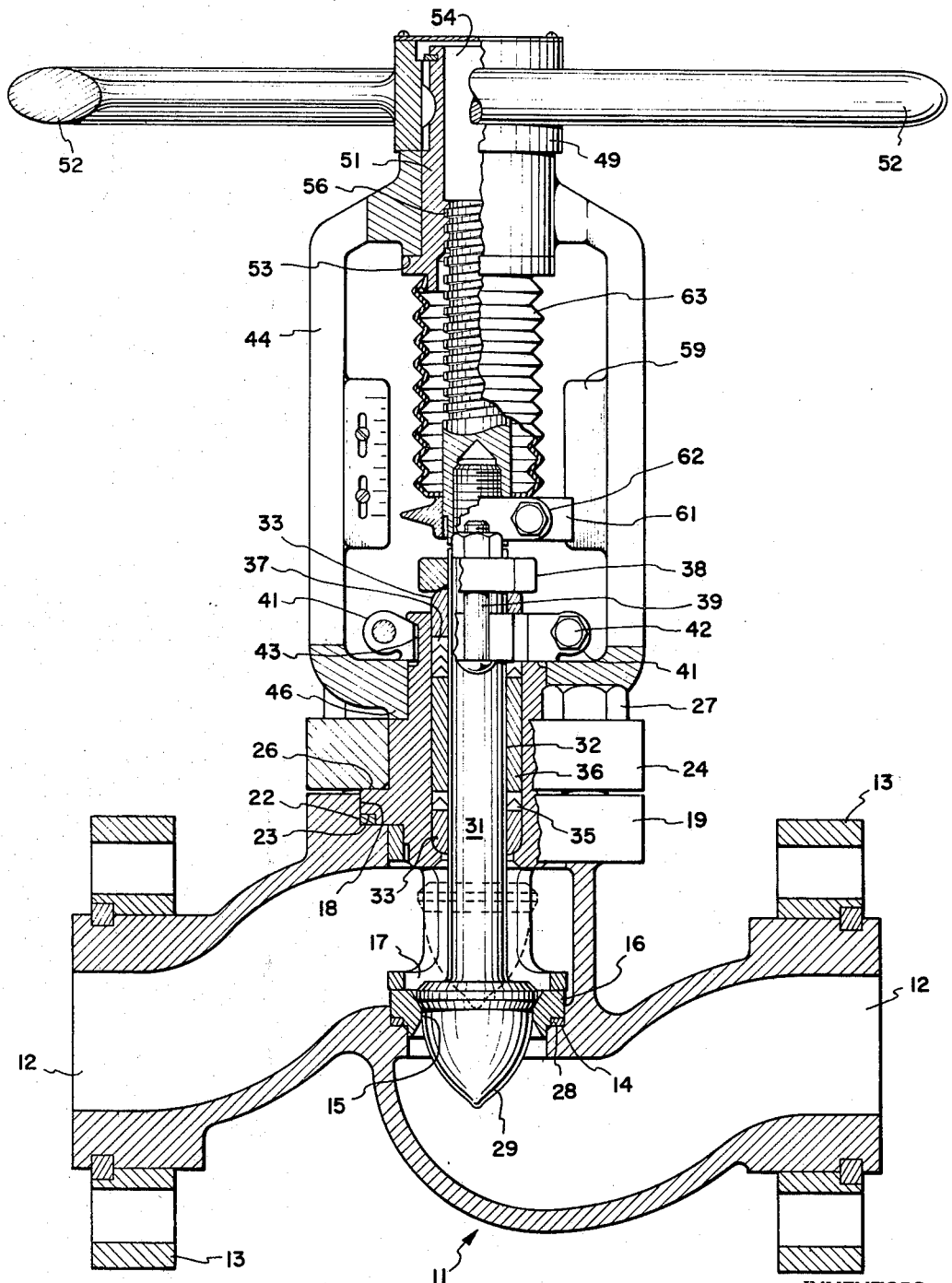
FIG. 2 is a sectional view of the valve of FIG. 1 in assembled form, some parts shown in elevation for purposes of clarity and dotted lines being employed to illustrate operation.

The valve comprises a hollow housing or body 11 with inlet and outlet ports 12 and usual installation flanges 13.

A bridge seat 14 is formed about the bridge on the interior wall in a plane transverse to the path of flow thus defining a control port 15 through the valve bridge; and a valve seat ring 16 of suitable material is received on the bridge seat and clamped thereon by one end of a cage 17 as hereinafter explained.

An access port 18 with a peripheral flange 19 is provided on one side of the valve body opposite the seat 14 and in axial alignment with the port 15. A bonnet 21 is fitted into the opening to bear simultaneously against a gasket 22, and the outer end of the cage 17. The gasket 22 is fitted in a recess defined by a shoulder 23 in the inner wall of the flange 19. A bonnet flange 24 is fitted around the bonnet and bears against a shoulder 26 on the bonnet. Suitable fasteners, such as cap screws 27, detachably secure the bonnet flange to the valve body thus clamping in place the bonnet 21, gasket 22, cage 17, seat ring 16 and a gasket 28 under the seat ring.

With the bonnet in place on assembled valve, flow control is effected by a plug 29 as it is moved by its stem 31 between a fully closed position in contact with the seat ring to an open position (dotted lines) where it is withdrawn from the seat ring.

The plug stem 31 has a smooth surface and passes axially through a bore 32 in the bonnet. Encircling the stem within the bore to accurately guide the stem while sealing against leakage is a particular arrangement of seals and guides comprising a pair of precisely machined stem guides 33 located one at each opposite end of the bore, a first compressible packing 37 next to the spacer; and the outer guide 33 is next to the second packing. The lower guide bears against and is restrained by a shoulder at the inner end of the bore and the other parts are then stacked on this guide and the assembly is clamped together to compress the packing by means of a gland flange 38 fitted over the stem at the outer end of the bonnet. The flange bears against the outer guide 33 and clamping pressure is applied by bolts 39 which provide an adjustable connection between the gland flange 38 and a two-piece yoke clamp 41 which is held in assembled position by bolts 42, in an outward facing annular channel 43 in the sidewall of the bonnet adjacent its outer end.

The guide arrangement is important because by utilizing a pair of spaced apart precisely machined guides fitted with close tolerance about the stem at opposite ends of the bore, a strong and wobble-free yet accurate plug guide assembly is provided. The guides are formed of rigid, substantially non-compressible and non-deformable material, preferably metal although plastics may be employed if adapted to the contemplated service.

Actuation of the valve is effected by manual or automatic means connected to the outer threaded end of the stem. The illustrated embodiment employs a manual actuator which comprises a yoke 44 having a collar 46 that fits over the end of the bonnet and is clamped in place between the yoke clamp 41 and a shoulder on the bonnet. A collar 49 is located at the other end of the yoke. A bushing 51 is fitted through the collar and a hand wheel 52 is keyed thereon with a machined surface of its hub in face to face thrust-bearing relationship with a bearing surface on the collar. On the other side of the collar, thrust is absorbed by a shoulder 53 on the housing.

A bore 54 extends axially through the bushing and is threaded adjacent its inner (lower) end to accept a threaded shaft 56 which is in turn secured to the outer end of the stem 31 by any suitable means.

Bosses 59 extend inwardly from the opposite sides of the yoke. One boss carries a position-indicating scale while the other boss acts as a stop against which a bifurcated tab 61 abuts to block rotation of the shaft 56. The tab 61 is part of a clamp 62 that encircles and is firmly engaged with the lower end of the shaft 56. A flexible dust cover 63 concentric about the shaft extends between the clamp 62 and the bushing. Rotation of the handwheel and bushel raises or lowers the threaded shaft and the plug as desired.

With the valve construction of the invention several important advantages are obtained. For one, by guiding the plug solely by its stem as it passes through the bonnet, rather than by sliding contact between the plug and cage, initial manufacture is facilitated because the need for close machining and precise positioning of the cage is eliminated. This also means that neither corrosion of the cage nor physical wear due to contact between the cage and plug can cause improper guiding of the plug. Thus the valve is well suited for service where corrosion is a factor, and its normal life is increased because its guidance system is out of the flow path.

The plug stem is of uniform diameter throughout its entire length from plug through the bonnet. Thus, there are no sections of enlarged diameter forming shoulders on which solids can accumulate to become packed between the shoulder and bonnet and thus block outward stem movement. In connection with this feature, it is important that there be no sharp shoulders of increased diameter contacting the bonnet when the plug is in the completely withdrawn or full open position. In short, then, this requirement of the invention may be broadly stated as guiding the major diameter of the stem through the bonnet. Since the guided part of the stem is its major diameter, and there are no shoulders of increased diameter and the inner end of the bonnet is free from the deep pockets that would otherwise be required to accommodate the shoulders. This further simplifies construction.

Assembly and disassembly of the valve is simple, requiring only the removal of the cap screws holding the bonnet flange. As shown in FIG. 1, this enables lifting out of the bonnet with plug as a unit. The cage and seat ring are then easily removed for inspection, cleaning, repair or replacement. The cage comprises a cylinder with windows cut in its side walls and thus can serve as the seat ring retainer without interfering with flow. The valve construction of the invention does not require screwing together or press fitting of working parts. Instead, all assembly is by bolts and this feature, combined with the feature of a cage for retaining the seat ring and the guiding of the plug stem solely at its maximum diameter in the bonnet provides a long lasting valve useful in all types of service yet is relatively low in initial cost and easy to maintain.

What is claimed is:

1. A valve comprising a housing having an inlet and outlet and an interior valve bridge between said inlet and outlet, a flow port through said bridge, an access opening in the wall of said housing adjacent said bridge and providing access thereto, a seat ring received on said bridge concentrically about said port, a cage in said housing bearing against said seat ring, a bonnet fitted into said opening to bear against said cage, an elongated bore extending through said bonnet, a plug adapted to engage said ring and having an elongated stem the major diameter portion of which passes through said bore in said bonnet whereby said plug may be moved into and out of contact with said ring by reciprocation of said stem, means detachably securing said bonnet in said housing thereby to clamp said ring and said cage between said bridge and said bonnet so that said cage loosely encircles said plug while securing said ring in place, and means in said bore in said bonnet providing the sole guidance on said plug said means comprising non-compressible guide means in said bore snugly encircling said major diameter portion of said stem.

2. A valve according to preceding claim 1 with the addition of a seat formed on said bridge about said port and said ring is received on said seat.

3. A valve according to preceding claim 1 in which said means in said bore guiding said stem through said bonnet comprises a pair of spaced apart guide means located adjacent opposite ends of said bore.

4. A valve according to claim 1 in which said guide means comprises a pair of identical spaced apart non-compressible guides formed as bushings, one of said guides is located at the inner end of said bore through said bonnet and snugly encircles said stem adjacent the valve interior while being restrained by an inwardly extending shoulder in said bore, the other of said guides snugly encircles said stem adjacent the other end of said bore, compressible sealing members are provided in said bore between said guide means, and clamp means are located adjacent the outer end of said bonnet to be engageable with said other one of said guides to urge it toward said first guide whereby to compress said packing to seal said shaft simultaneously with securing of said guides in said bore.

References Cited

UNITED STATES PATENTS

| | | | |
|---|---|---|---|
| 209,160 | 10/1878 | Deavs et al. | 251—214 X |
| 776,900 | 12/1904 | Forse | 251—214 X |
| 990,841 | 5/1911 | Collins | 277—123 |
| 2,310,558 | 2/1943 | Teeters et al. | 251—214 |
| 2,370,245 | 2/1945 | Jacobsson et al. | 251—214 |
| 2,780,233 | 2/1957 | Volpin | 251—267 X |
| 2,797,063 | 6/1957 | Hobbs | 251—266 X |
| 3,389,717 | 6/1968 | Povalski et al. | 137—454.5 X |

WILLIAM F. O'DEA, Primary Examiner

D. R. MATTHEWS, Assistant Examiner

U.S. Cl. X.R.

251—266; 137—454.2